D. M. BRANNON.
BELT SHIFTER.
APPLICATION FILED FEB. 17, 1917.
1,297,787.
Patented Mar. 18, 1919.
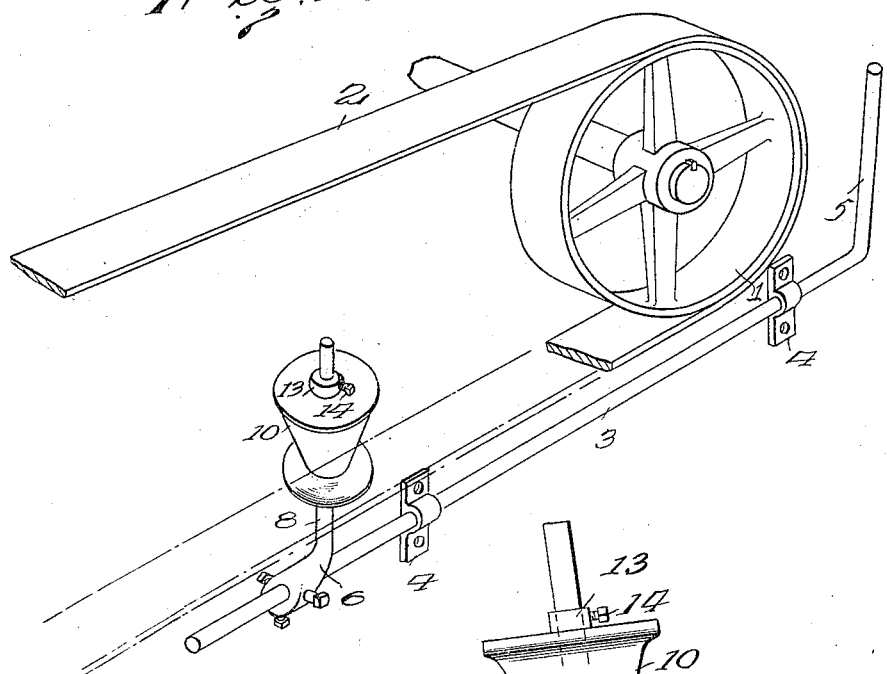
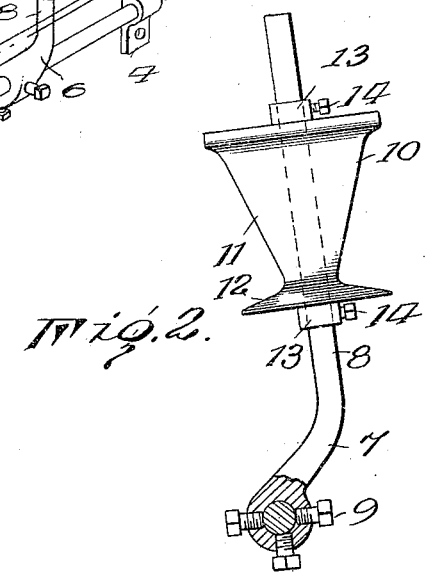
D. M. Brannon
Inventor
By Geo. T. Kimmel
Attorney

UNITED STATES PATENT OFFICE.

DANIEL M. BRANNON, OF WILLISTON, NORTH DAKOTA.

BELT-SHIFTER.

1,297,787.

Specification of Letters Patent.   Patented Mar. 18, 1919.

Application filed February 17, 1917. Serial No. 149,301.

*To all whom it may concern:*

Be it known that I, DANIEL M. BRANNON, a citizen of the United States, and resident of Williston, in the county of Williams and State of North Dakota, have invented certain new and useful Improvements in Belt-Shifters, of which the following is a specification.

This invention relates to new and useful improvements in belt shifters, and its primary object is the provision of a novel device of this character especially adapted for use in connection with traction engines, by means of which a belt may be easily and quickly shifted from the driving pulley of the engine.

Another object of the invention is to provide a belt shifter of this character which is applicable for operative connection with any of the types of traction engines now in general use, without any material change to the structure thereof.

Another object of the invention is to provide a device of this character whereby the belt may be shifted from the drive pulley without the necessity of the operator moving from the engine control.

A still further object of the invention is to provide a device of this character which is easily and simply constructed, inexpensive to manufacture, and one which will be very efficient in operation.

With these and numerous other objects in view my invention consists of the novel features of construction, combination and arrangement of parts which will be herein referred to and more particularly pointed out in the specification and claims.

In the drawings:

Figure 1 is a perspective view of the belt shifter, showing how the same is operatively positioned, and Fig. 2 is an end elevation of the arm with the belt engaging roller thereon.

In describing my invention I shall refer to the drawings in which similar reference characters designate corresponding parts throughout the several views. The numeral 1 designates the drive pulley of a traction engine, that is disposed adjacent the boiler, not shown, and which has trained over said pulley a drive belt 2. My novel type of belt shifter is applied to the engine adjacent the lower reach of the belt 2 as clearly shown in Fig. 1 of the drawings, and when in operation is adapted to move said reach of the belt outwardly to disengage the same from the pulley.

The belt shifter comprises a rock shaft 3 which is preferably rotatably mounted on the side of the boiler, not shown, in bearings 4. The rock shaft 3 is provided at one end with an operating handle 5, while slidably mounted on the opposite end thereof is a laterally and upwardly projecting arm 6. The rock shaft 3 is disposed substantially parallel with the lower reach of the belt 2, and slightly below the same, and the arm 6 that is mounted on the end of said shaft extends outwardly as shown at 7, and then upwardly as shown at 8 adjacent the inner edge of the belt. The portion of the arm 6 that is slidably mounted on the shaft 3 is provided with a plurality of fastening means 9, which preferably comprise bolts, and which are adapted to engage the shaft to hold the arm at various angularly and longitudinally adjusted positions with respect thereto in order that the belt engaging rollers, hereinafter described, can be so adjusted with relation to the belt and its pulley as to insure effectual functioning thereof.

The straight portion 8 of the arm 6 has mounted thereon a belt engaging roller 10, which is formed of two frusto-conical shaped portions 11 and 12, which have their reduced ends connected, the upper portion 11 being larger than the lower portion 12 and serving to cause the belt engaged thereby to be moved downwardly onto said portion 12, thus insuring positive engagement with the belt and facilitating the shifting or moving thereof. The roller 10 is slidably mounted on the portion 8 of the arm 6, and is held in various adjusted positions by means of a pair of retaining collars 13, which are positioned adjacent the opposite ends of the roller, and are adapted to be held in position by clamping bolts or screws 14 that project therethrough. By this means the roller 10 is vertically adjustable on the straight portion 8 of the arm.

In operation when the various parts of this device are positioned as shown in Fig. 1 of the drawings, it is obvious that the roller 10 will be disposed into engagement with the inner edge of the lower reach of the belt 2. The roller 10 is so constructed that it is adapted for engagement with various sized belts, and also allows for a certain amount of the sagging in the lower reach of the belt in which it is disposed into engagement with. To throw the belt from the drive pulley 1, it is only necessary for the operator to grasp the handle 5, and move the same outwardly whereupon the shaft 3 will be rocked, and the arm 6 swung outwardly and downwardly. Owing to the fact that as the roller 10 is engaged with the lower reach of the belt, this movement of the arm will throw the roller against the belt, and move said belt from out of engagement with the drive pulley. Owing to the extreme simplicity of this device, the same is adapted to be applied to traction engines without any change whatsoever in the structure of the same. The roller, and roller supporting arm are adjustable as has been fully described to allow the device to be adjusted to various sized types of drive belts.

Having thus fully described my invention, what I claim as new and desire to secure by Letters Patent, is:

1. A belt shifter including an operating shaft, an arm carried by the operating shaft, a roller mounted on said arm and arranged at substantially right angles to the shaft, said roller being tapered and having its tapered end formed with an enlarged annular beveled flange whereby to maintain the same in engagement with the belt during movement thereof.

2. A belt shifter including an operating shaft arranged in parallelism with the belt, an arm arranged at angles to said shaft and capable of longitudinal adjustment thereon, and a substantially frusto-conical roller adjustably mounted on said arm having an annular beveled flange formed on its tapered end whereby to maintain the same in engagement with the belt during movement thereof.

In testimony whereof I affix my signature hereto.

DANIEL M. BRANNON.

Copies of this patent may be obtained for five cents each, by addressing the "Commissioner of Patents, Washington, D. C."